F. L. ANDREN.
WIRE COILING MACHINE.
APPLICATION FILED MAY 14, 1917.
1,340,516.
Patented May 18, 1920.
5 SHEETS—SHEET 1.
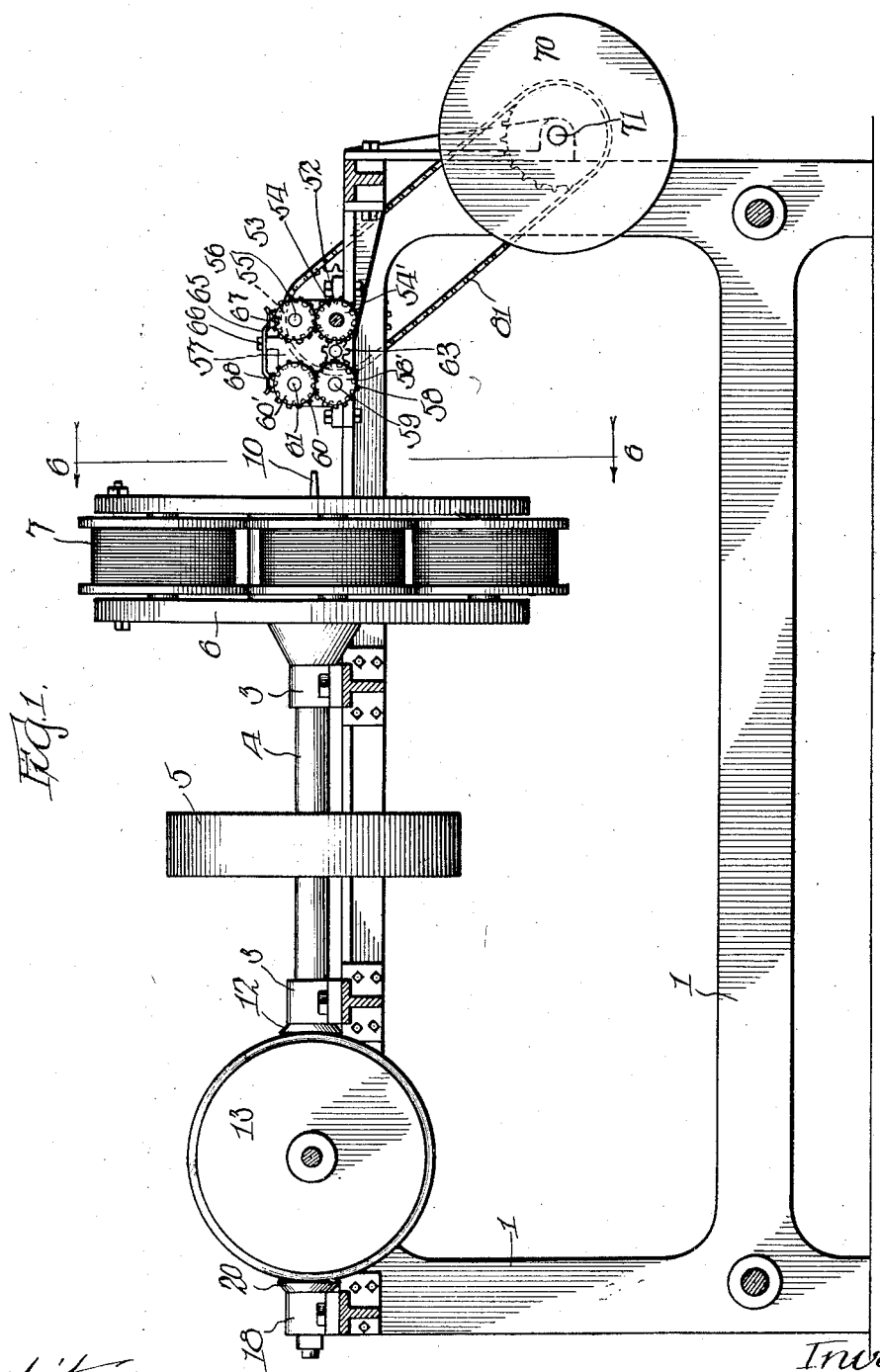

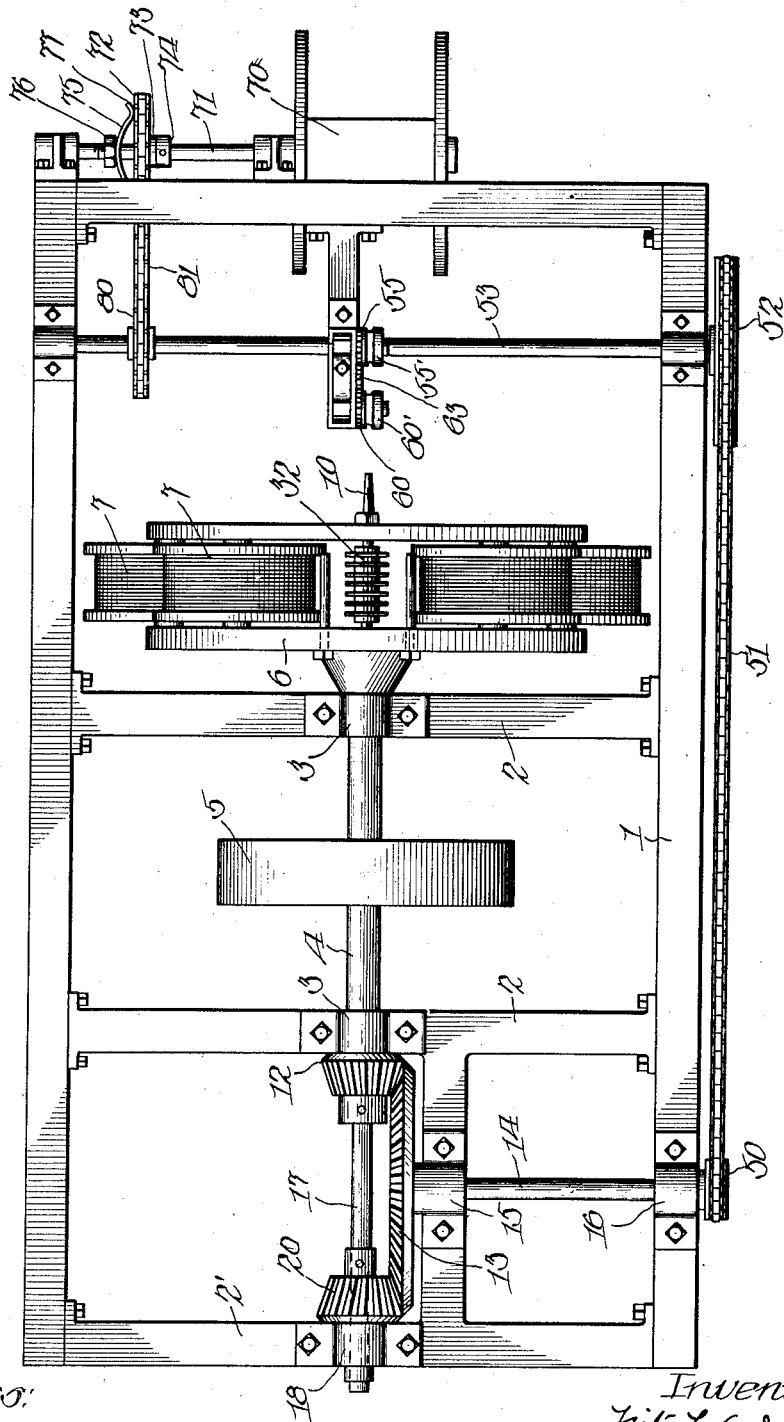

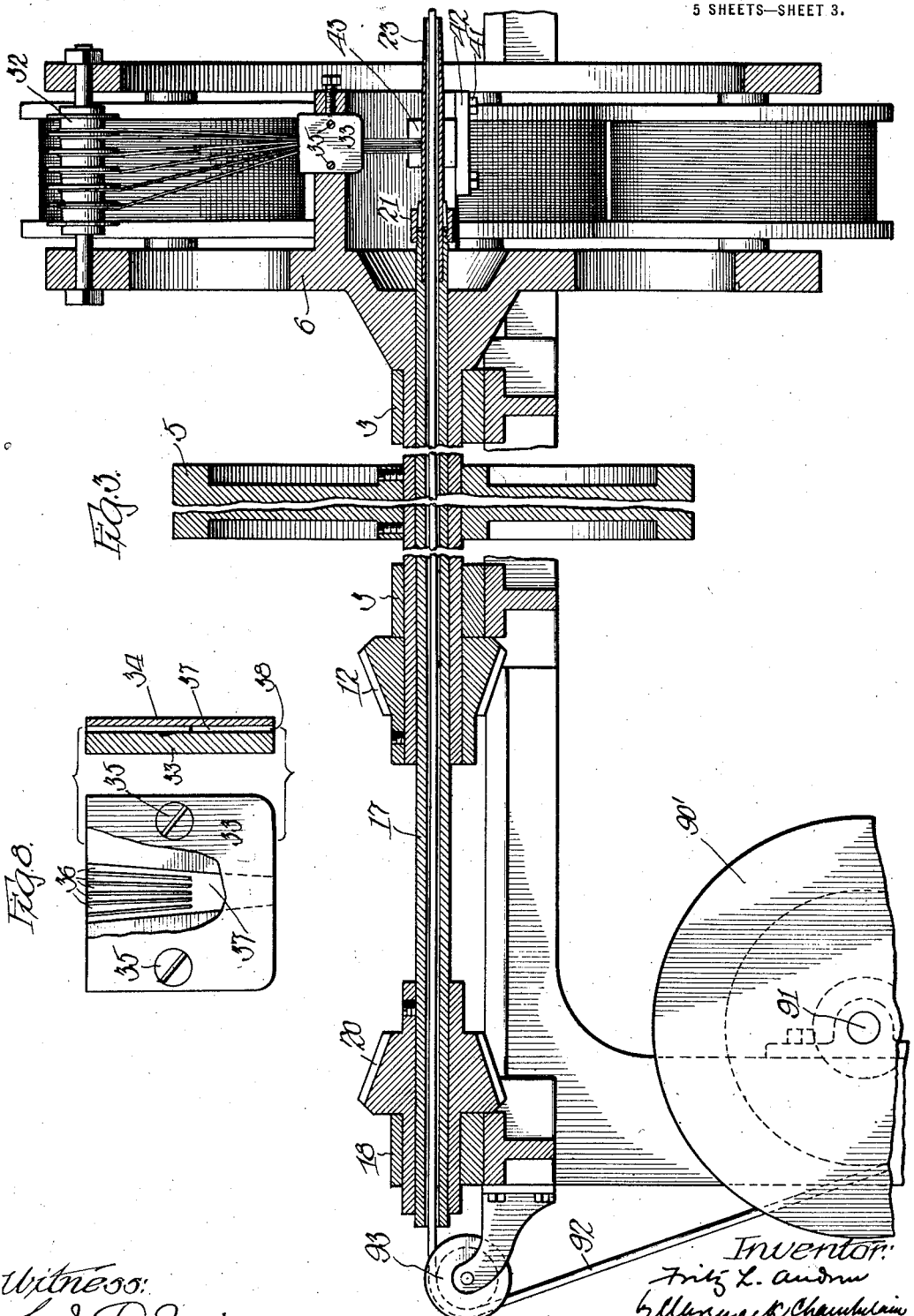

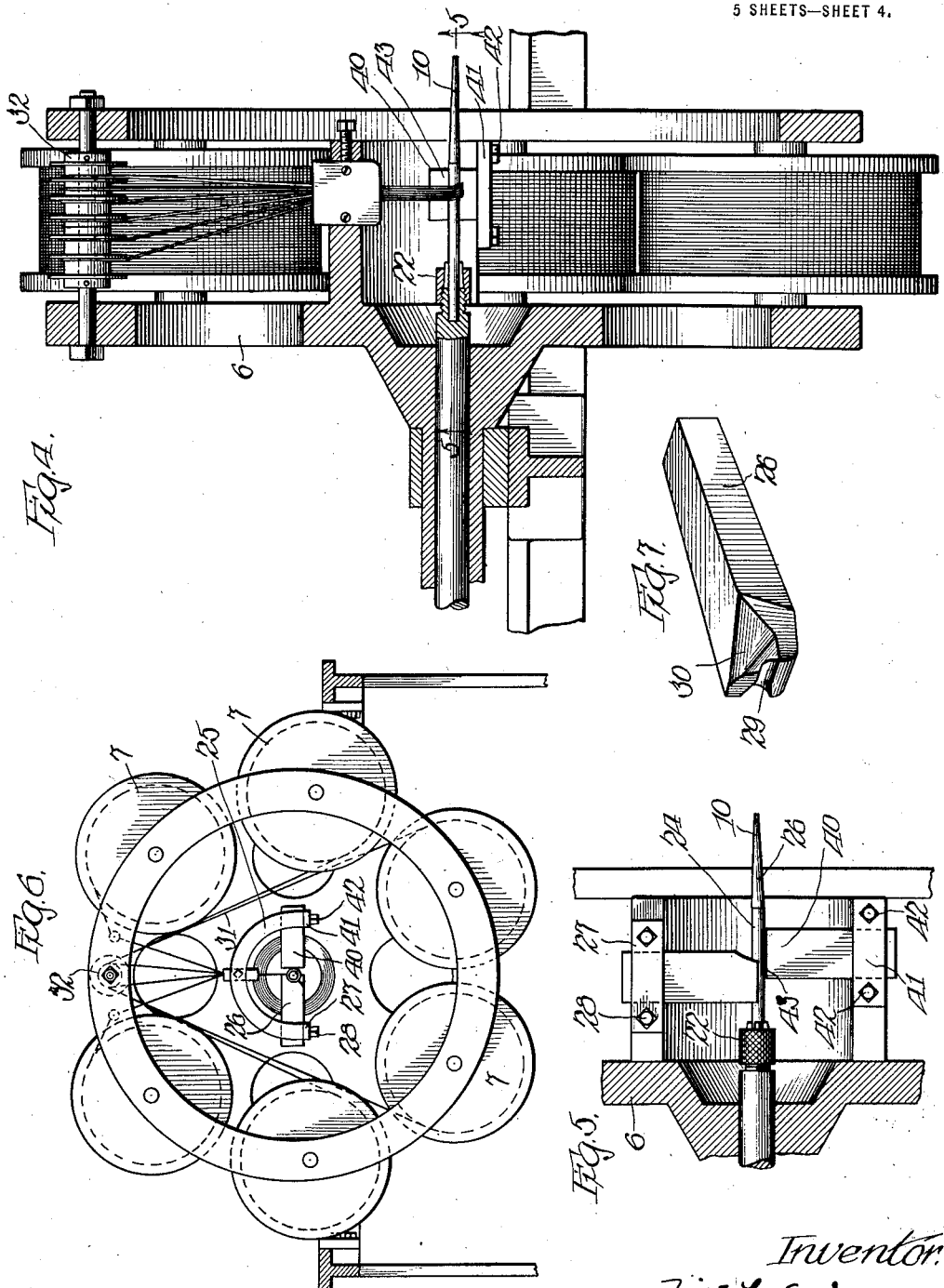

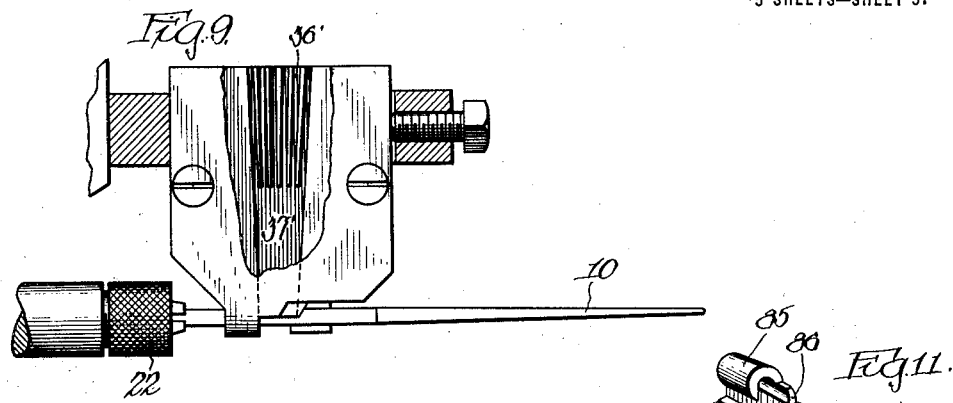
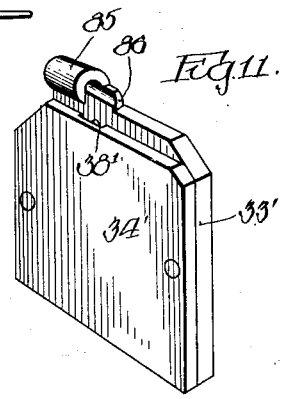
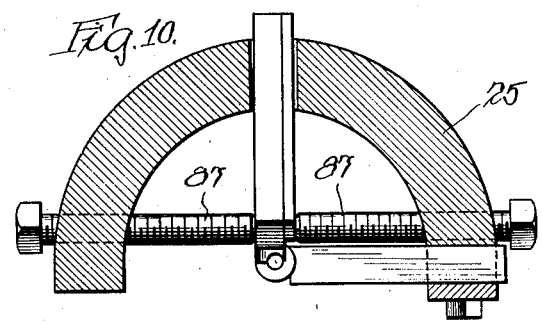
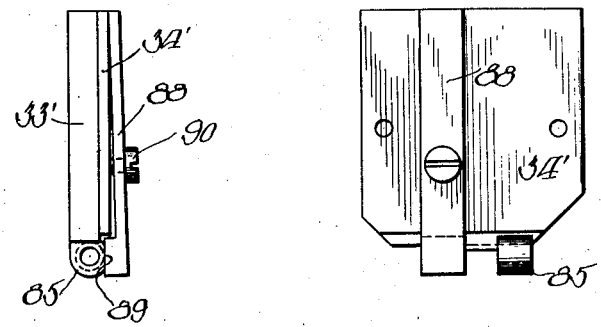
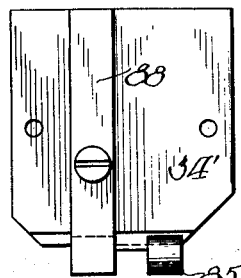

UNITED STATES PATENT OFFICE.

FRITZ L. ANDREN, OF CHICAGO, ILLINOIS.

WIRE-COILING MACHINE.

1,340,516.  Specification of Letters Patent.  Patented May 18, 1920.

Application filed May 14, 1917. Serial No. 168,347.

*To all whom it may concern:*

Be it known that I, FRITZ L. ANDREN, a citizen of the United States, residing at the city of Chicago, in the county of Cook and State of Illinois, have invented certain new and useful Improvements in Wire-Coiling Machines, of which the following is a specification.

My invention relates to machines for making wire cables in which a plurality of wires are disposed in helical form to provide a structure which may be tubular, or which may inclose a longitudinal core. Such tubular cables may be used in many ways, but the first kind is typically available for the edges of "woven" wire bed spring, in which great strength together with some elasticity are required; on the other hand, where no extreme longitudinal stress is exerted the cable may be wound about a core and as this may be of insulated wire the cable is adapted to provide a flexible conduit for electrical use.

It is the object of my invention to provide a machine for making cables of the character described, and which may be used for the suggested purposes, and for many others. In said machine I provide means for varying the size of the cable, as well as of making such cable either with or without cores as desired. I also provide means by which as the cable strand wires are delivered to the coiling mechanism in close and uniform relation, they are positively crowded into contact in the act of coiling and also smoothly laid upon the coiling mandrel. I also provide means positively to draw the coils from the coiling mechanism at substantially the speed at which they are formed and positively to compress them into almost rigid contact, thus making a very dense and uniform product. I am also able to use a great variety of wire as to material and the characteristics thereof, and as the required products may vary from time to time.

The principles of my invention are illustrated in the drawings, in which—

Figure 1 is a longitudinal sectional elevation of my improved wire coiling machine on the line 1—1 of Fig. 2;

Fig. 2 is a top view thereof;

Fig. 3 is an enlarged view in vertical section, showing a portion of the mechanism shown in Fig. 1;

Fig. 4 is an enlarged section of the coiling head shown in Fig. 1;

Fig. 5 is a section of Fig. 4 on the line 5—5 thereof;

Fig. 6 is a cross section of Fig. 1 on the line 6—6;

Fig. 7 is a perspective view of a crowder arm to be mounted on the coiling head;

Fig. 8 is a wire feeding device;

Figs. 9 to 13 show alternative forms of the feeding and smoothing devices.

Further describing my invention with reference to the drawings, 1 represents the frame of a machine having the cross pieces 2, on which at 3, 3 is journaled the hollow main shaft 4, carrying the driving pulley 5. On one end of the said shaft is mounted the winding head 6, carrying the spools 7, from which wire to be used in the manufacture of the cables for which the machine is designed is unwound and applied to the mandrel 10, as will hereafter be described. At the other end of said shaft 4 is a beveled driving pinion 12 meshing with the intermediate gear 13 mounted on one end of shaft 14, which is journaled at 15 and 16 to the frame of the machine. An auxiliary shaft 17, which may be hollow as illustrated in Fig. 3, extends through the hollow shaft 4, being journaled therein, while one end thereof is journaled at 18 to the cross piece 2' of the machine. A bevel pinion 20 is mounted on said shaft to mesh with the gear 13 so that when the shaft 4 is revolved in one direction shaft 17 will be driven in the opposite direction. The inner end of said auxiliary shaft 17 is adapted to take the mandrel 10, and to this end may be provided with a socket of suitable size as shown at 21 in Fig. 3, or it may be provided with a chuck 22 as shown in Figs. 4, 5 and 9. The said mandrel may be solid as illustrated in Figs. 4 and 5, or may be hollow as shown at 23 in Fig. 3, but whether solid or hollow the body thereof should have a cylindrical body or forming portion as at 24 in Fig. 5, and have a tapered relief portion 26, as illustrated in the same figure. The said mandrel should be considerably elongated in the relief portion and extended toward the compression rolls hereinafter to be described, thereby supporting the coiled wire until the action of the compression rolls has been applied thereto. A support for the devices which coöperate with the mandrel in making the coiled wire product is shown in Fig. 6 and may consist of a semi-cylindrical structure, having the walls 25 mounted axially with the mandrel. On one side of the mandrel, upon said device, is mounted the crowder arm 26, which is adjustably secured in place by the cross bar 27, and the set screw 28. Said crowder arm has a notch 29 in its projecting end which is adapted to fit over the body portion of the mandrel to which it is applicable. It is also provided with a slanting or beveled edge 30, the use of which will be hereinafter explained. A wire-feeding device is adapted to take the wires 31, which are unwound from the spools 7, and are then passed around a pulley 32 from whence they are led side by side to said feeding device. The latter is shown in Fig. 8 and consists of a plurality of superimposed plates 33, 34 adapted to be secured together by screws 35. The proximate faces of the two plates are provided with a channel or runway having corrugations 36, in number corresponding to the wires which are to be used at any time, and which, when the plates are secured together, form guides through which the wires are passed into the chute 37, through which they pass side by side until they are drawn from the lower part of said chute adjacent to the mandrel body 24 about which they are wrapped. A wiper or smoothing arm 40 is secured by means of the cross bar 41 and set screws 42 at the opposite side of the mandrel to that on which the crowder arm is attached. It is provided with a substantially flat face 43 at the end nearest to the mandrel.

When power is applied to the driving pulley 5, the shaft 17, carrying the mandrel is rotated in one direction and the shaft 4, carrying the coiling head, is rotated in the opposite direction. The wires from the spool 7, passing through the feeding device are coiled around the mandrel and kept in close relation to each other by slanting face 30 of the crowder arm 26. Its action also forces the coil which is thus formed toward the outer end of the mandrel and to the tapered or release part thereof, at which the grip of the coiled wire is relieved. Meanwhile the coiled wire on the mandrel passes the wiper arm or smoothing device which evens the coils while they are still on the cylindrical portion of the mandrel.

A sprocket pinion 50 is mounted on the outer end of shaft 14, and is connected by a sprocket chain 51 to the sprocket wheel 52 on the outer end of shaft 53. A gear 54 is mounted on said shaft and meshes with gear 55 mounted on a stub shaft 56, adjustably attached to a support 57. A gear 58 is mounted on a stub shaft 59 on the support 57 and gear 60 is adjustably mounted on the stub shaft 61 attached to the support 57. On the faces of gears 54, 55, 58 and 60 are secured grooved compression wheels 54', 55', 58' and 60'. An idle pinion 63 connects the gears 54 and 58 so that the said grooved pulleys coöperating in pairs will turn in the same direction to receive a coiled wire as it passes from the mandrel. The grooves in the faces of said pulleys should be of such form and dimension as to compress the product and give it a uniform finish, as well as a uniform and substantial structure. A spring 65 secured by the set screw 66 on the top of support 57 has unequal arms 67 and 68 extended so as to bear upon suitable mechanism controlling the vertical action of stub shafts 56 and 61, whereby, when the coiled wire passes from the mandrel, it is received with a more yielding pressure between the pulleys 60' and 58' than between the pulleys 55' and 54', the latter pair giving the greatest and most positive compression of the product. A take-up drum 70 is mounted on shaft 71. A sprocket wheel 72 is frictionally mounted on the said shaft, the hub 73 abutting on collar 74. A spring 75, whose pressure is adjusted by means of the nuts 76, has the free ends 77 bearing on one face of said sprocket wheel. A driving gear 80 is mounted on the shaft 53 and connected by means of sprocket chain 81 with the sprocket wheel 72. Means is thereby provided by which the finished product is wound upon the spool 70 and allowance made for the increased take-up tendency of the spool 70 as the amount of finished product wound thereon increases.

An alternative form of the devices which are used for feeding the wires to the mandrel and for laying and smoothing the same thereon is shown in Figs. 9 to 13 inclusive. The feeding device shown in Figs. 9 and 11 consists of the plates 33' and 34', in structure substantially corresponding to the same as shown in Fig. 8, and in like manner provided with corrugations 36' and runway 37'. A crowder device 85 having the slanting face 86 is secured to or integrally formed on the plate 33' in such relation to the outlet opening 38' that the wires as they pass therethrough are pushed into intimate contact and given longitudinal movement on the mandrel to provide space for the continuous wrapping of wire thereon. Sufficient rigidity is given to the feeding plates by means of set screws 87 which project through the mounting 25 and impinge on the feeding plates at points adjacent to the mandrel. A smoothing element may also be mounted upon the said plates as shown at 88 in Figs. 12 and 13. Such element is provided with a smoothing face 89 and is adjustably held in position with reference to the mandrel and the wires mounted thereon by means of set screws 90.

I have described my machine and its operation primarily with reference to the use of a solid tapering mandrel by which a hollow tubular product is made, but the machine is equally applicable as shown in Fig. 3 to the use of a hollow mandrel and the production of a cored product. As shown in the said figure, the shaft 17 is hollow and also provided with a hollow mandrel. At the rear of the machine a spool 90' of core material, such as an insulated wire, may be mounted on a shaft 91, from which the core material 92 is carried around a pulley 93 and fed into the hollow shaft 17. When extended through said shaft and through the mandrel at the operating end thereof the operation of the machine in every respect is the same as heretofore described.

I claim:

1. In a wire coiling machine having a coiling head and a mandrel adapted to relative rotation; a device carried by the said head consisting of a plurality of superimposed plates secured together and revoluble with the said head, said plates having a runway therebetween adapted to receive a plurality of converging wires and present them in substantial contact with each other to said mandrel.

2. In a wire coiling machine having a coiling head and a mandrel adapted to relative rotation; a feeding device on the said head adapted to receive a plurality of wires and present them simultaneously side by side to said mandrel, and a crowder arm rigidly related to the feeding device and adapted to hold said wires in contact with each other on the mandrel.

3. In a wire coiling machine having a coiling head and a mandrel adapted to relative rotation; a feeding device on the said head adapted to receive a multiplicity of wires and present them simultaneously side by side to said mandrel, and a crowder arm rigidly related to the feeding device and adapted to hold said wires in contact with each other and give longitudinal movement thereto on the mandrel.

4. In a wire coiling machine having a coiling head and a mandrel adapted to relative rotation; a feeding device on the said head adapted to receive a plurality of wires and present them simultaneously side by side to said mandrel, a crowder arm rigidly related to the feeding device and adapted to hold said wires in contact on the mandrel, and a wiper bar rigidly related to the feeding device to smooth the wires when coiled on the body of the mandrel.

5. A feeding device for wire coiling machines having superimposed plates secured together and provided with a runway therebetween, the upper part of said runway being provided with means for separating wires as received from each other and the lower part thereof adapted to cause adjacent wires to be in substantial contact.

6. A feeding device for wire coiling machines having superimposed plates and provided with a runway therebetween, the upper part of said runway being provided with wire supporting guideways and the lower part adapted to effect a substantial contact of adjacent wires passing therethrough.

7. A feeding device for wire coiling machines comprising a plurality of superimposed plates secured together and having a fan shape runway therebetween, provided with corrugations converging toward the lower part of said runway.

8. In a wire coiling machine provided with a coiling head and a mandrel revoluble relatively to each other, a feeding device therefor provided with a guideway and having an element mounted on the coiling head adapted to engage said mandrel and to give longitudinal movement on the said mandrel to the said wires as they are coiled thereon.

9. In a wire coiling machine having a coiling head, a mandrel mounted centrally of said coiling head and means for rotating said coiling head and mandrel in opposite directions, a compression mechanism operatively connected therewith comprising a foundation piece, a pair of yieldingly related grooved rolls on the foundation piece, a second pair of yieldingly related grooved rolls in the rear of the first, and means for permitting unequally yielding action in the said pairs of rolls.

10. In a wire coiling machine, a frame, a hollow main shaft on the frame, means for driving the same, a coiling head on one end of the main shaft, a beveled pinion on the other end of the main shaft, an auxiliary shaft journaled in the main shaft, a mandrel attached to one end of the auxiliary shaft, a beveled pinion on the auxiliary shaft, and an intermediate gear meshing at opposite points of its periphery with the said pinions whereby the said head and mandrel are caused to rotate in opposite directions.

11. In a wire coiling machine, a frame, a hollow main shaft on the frame, means for driving the same, a coiling head on one end of the main shaft having a multiplicity of peripherally disposed feeding spools, a beveled pinion on the other end of the main shaft, an auxiliary shaft journaled in the main shaft, a mandrel attached to one end of the auxiliary shaft, a beveled pinion on the auxiliary shaft, an intermediate gear meshing at opposite points of its periphery with the said pinions whereby the said head and mandrel are caused to rotate in opposite directions, and means connected with the head for receiving a multiplicity of wires from said spools and presenting them side by side to said mandrel.

12. In a wire coiling machine; a frame, a hollow main shaft on the frame, means for driving the same, a coiling head on one end of the main shaft, a beveled pinion on the other end of the main shaft, an auxiliary shaft journaled in the main shaft, a mandrel attached to one end of the auxiliary shaft, a beveled pinion on the auxiliary shaft, an intermediate gear meshing at opposite points of its periphery with the said pinions, grooved compression wheels supported by the said frame, and means actuated by the shaft of said intermediate gear for driving the said compression wheels.

13. In a wire coiling machine; a frame, a hollow main shaft on the frame, means for driving the same, a coiling head on one end of the main shaft, a beveled pinion on the other end of the main shaft, an auxiliary shaft journaled in the main shaft, a mandrel attached to one end of the auxiliary shaft, a beveled pinion on the auxiliary shaft, an intermediate gear meshing at opposite points of its periphery with the said pinions, grooved compression wheels supported by the said frame, a take-up device on the said frame, and means actuated by the shaft of said intermediate gear for driving the said compression wheels and the said take-up device.

14. In a wire coiling machine; a frame, a hollow main shaft on the frame, means for driving the same, a coiling head on one end of the main shaft, a beveled pinion on the other end of the main shaft, an auxiliary shaft journaled in the main shaft, a mandrel attached to one end of the auxiliary shaft, a beveled pinion on the auxiliary shaft, an intermediate gear meshing at opposite points of its periphery with the said pinions, grooved compression wheels supported by said frame so that the contact faces thereof are substantially in alinement with the longitudinal axis of said mandrel, and means actuated by the shaft of said intermediate gear for driving the said compression wheels.

15. In a wire coiling machine having a coiling head and a mandrel adapted to relative rotation; a wire guiding device carried by the coiling head, means on the guiding device to crowd wires passing therethrough into engagement with each other on the said mandrel and means on the said guiding device to hold said wires in contact with the mandrel during the operation of the said crowding means.

In witness whereof, I have hereunto subscribed my name this 9th day of May, 1917, at Chicago, Cook county, Illinois.

FRITZ L. ANDREN.